Aug. 24, 1926.

E. WILDHABER 1,596,912

HOB AND METHOD FOR PRODUCING GEARS

Filed June 22, 1925    2 Sheets-Sheet 1

INVENTOR
ERNEST WILDHABER
BY
ATTORNEY

Aug. 24, 1926.

E. WILDHABER 1,596,912

HOB AND METHOD FOR PRODUCING GEARS

Filed June 22, 1925    2 Sheets-Sheet 2

INVENTOR
ERNEST WILDHABER.
BY
ATTORNEY

Patented Aug. 24, 1926.

1,596,912

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

HOB AND METHOD FOR PRODUCING GEARS.

Application filed June 22, 1925. Serial No. 38,724.

The present invention relates to the production of gears and particularly to the production of curved tooth bevel gears.

One object of this invention is to provide a cylindrical hob capable of accurately and rapidly cutting teeth upon a conical blank.

A further object of the invention is to provide a hob and a method for producing gears by which both sides of the teeth of a conical blank may be finish cut in one continuous cycle.

A further object of the invention is the provision of a hob capable of producing bevel gears of moderate longitudinal tooth curvature or spiral angle.

Further objects will be apparent hereinafter from the specification.

With the above and other objects in view the invention resides in the novel structure of my hob and in the steps constituting the novel process employed to produce gears with such hob, as set forth hereinafter in the specification and pointed out in the appended claims.

The present invention aims to provide a hob which will produce teeth on conical blanks of moderate longitudinal curvature and of identical curvature on opposite sides. According to this invention a cylindrical hob will be employed. This hob may be supported at both ends which means that it will be very rigid during cutting and the cutting speed of the hob will be substantially the same throughout its length.

For producing bevel gears a hob of the considered type should be capable of meshing with a basic crown gear having identical pitch lines on the longitudinally convex and concave sides of the its teeth. The pitch lines of the basic crown gear will be understood to be the intersection lines of the tooth sides of the crown gear with a plane which passes through the apex of the crown gear and is perpendicular to its axis. The pitch lines of the hob which mesh with those of the crown gear are contained in the cylindrical pitch surface which is tangent to the pitch plane, above described, of the crown gear.

It is well known that in a pair of gears or in a gear and rack drive the profile of one of the members may be assumed and the conjugate or mating profile then determined to suit the assumed profile. Instead of assuming one of the mating profiles, it is also possible, to assume a line of action and the shape of the mating profiles or longitudinal tooth curvature of the mating members may then be determined from the given line of action.

One object of the present invention is to provide a hob which will produce identical longitudinal tooth curves on opposite sides of the teeth of the basic crown gear. By assuming a line of action between the hob and the basic crown gear which will extend along the projection of the axis of the hob into the plane of the crown gear, this object may be attained.

The contact between the pitch lines of the hob and of the crown gear will not be changed when the pitch surface of the hob is developed into a plane of the crown gear. For the purpose of more readily understanding the present invention, then, the mesh or contact of hob and crown gear will be analyzed, considering the development of the hob.

Figure 1:
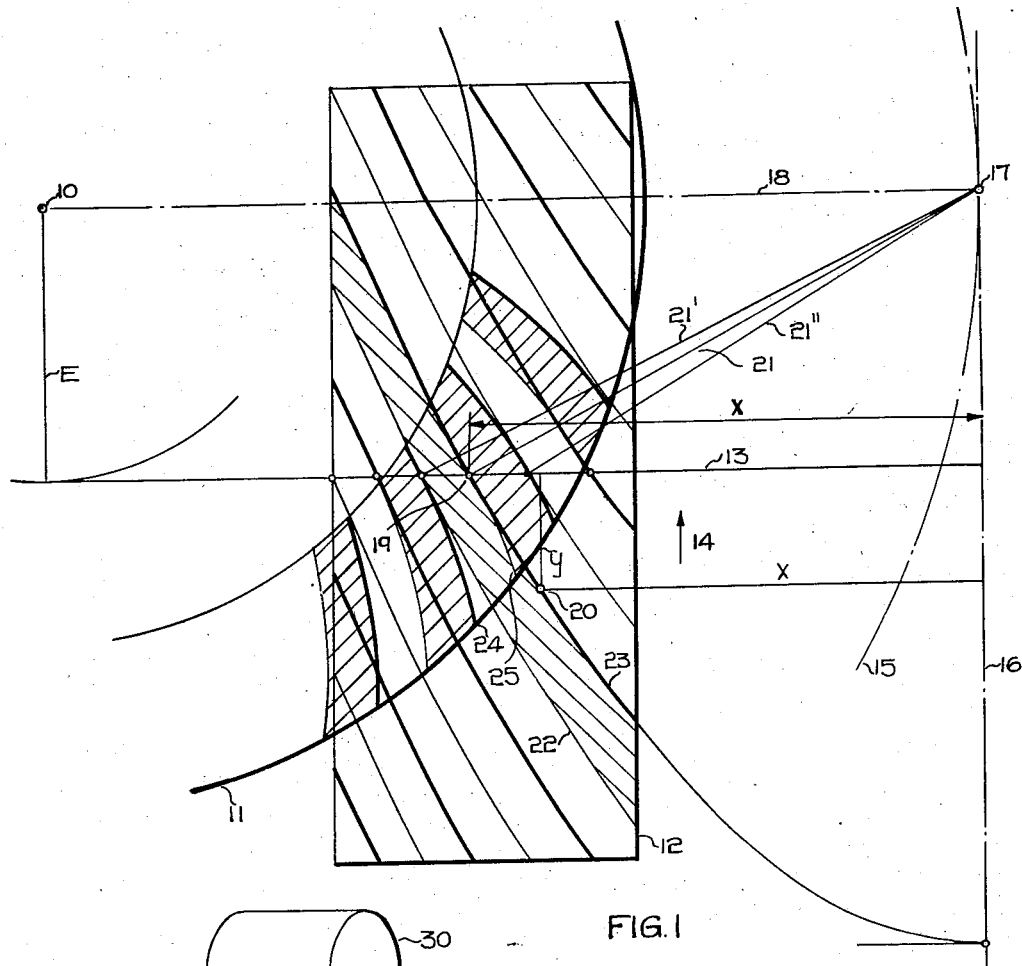
Fig. 1 is a diagrammatic view, showing the threads of a hob constructed according to my invention in mesh with a basic crown gear and showing relationship of the developed pitch surface of the hob to the pitch plane of the crown gear.

In Fig. 1, 10 is the axis of a basic crown gear 11 whose pitch plane coincides with the plane of the drawing. 12 is the developed pitch surface of the hob. The two pitch surfaces contact along the line 13 which is the projection of the hob axis into the pitch plane of the crown gear. This line 13 is the line of action between hob and crown gear. Assuming rotation between the hob and gear to occur at a uniform rate, the thread or threads of the hob will travel at a uniform rate along a line at right angles to the line 13. The direction of the travel of the hob threads is indicated in Fig. 1 by the arrow 14. Since the crown gear 11 will rotate at uniform velocity proportional to the travel of the threads of the hob, the contact between the threads of the hob and the teeth of the crown gear will be the same as if the sides of the thread of the hob were sides of rack teeth and the sides of the teeth of the gear, sides of conjugate gear teeth, that is, in development the pitch lines of hob and crown gear will mesh like rack and gear. This fact means that the pitch circle of the crown gear, the circle 15, will roll on the pitch line of the rack representing the developed hob without slipping. The dimensions of the hob may be of any size suitable for the purpose for which it is employed. The pitch line of the rack corresponding to the developed hob is indicated at 16. The pitch circle of the gear and the pitch line of the rack will contact at some point 17 on a line 18 drawn perpendicular to the gear axis.

The pitch circle of the gear and the pitch line of the rack corresponding to the developed hob can be located as follows: During one revolution of the hob the rack will move an amount equal to the circumference of the hob, that is, a distance $2\pi R$, where R is the pitch radius of the hob. If N represents the number of threads of the hob and N' the number of teeth of the basic crown gear, the amount of travel of the hob development per revolution of the crown gear will equal $$2\pi R \cdot \frac{N'}{N}.$$

If A denotes the distance 18 between the crown gear center 10 and the contact point 17 between the pitch circle of the gear and the pitch line of the developed hob, we have $$2\pi A = 2\pi R \cdot \frac{N'}{N}.$$

From this it follows:

$$A = R \cdot \frac{N'}{N}.$$

Since the tooth number of the crown gear can be expressed in terms of the tooth number of a blank and its cone angle, that is:

$$N' = \frac{N^0}{\sin a^0},$$

where $N^0$ and $a^0$ are respectively the tooth number and the cone angle of the blank or gear to be produced, it follows from the formula last given that:

$$A = R \cdot \frac{N^0}{N \sin a^0}.$$

Ordinarily a rack and gear mesh along a line of action which passes through a contact point 17 between the patch lines 15 and 16. In the present case, however, the line of action 13 has been assumed offset from this point 17.

Though the assumed line of action would be very unusual for a gear and rack drive, the mating longitudinal tooth curves of gear and hob must none the less fulfill the fundamental requirements of mating tooth curves, namely, the perpendicular to any two contacting curves of gear and hob at any point 19 of the line of action 13 must pass through the contact point 17.

This fundamental fact enables us to determine now the longitudinal tooth curvature of rack and gear, that is, the direction of the pitch lines of the developed hob and of the crown gear when the desired conditions of mesh of hob and gear are attained.

We shall now determine the direction of the pitch lines of the hob. The radius A of the pitch circle 15 of the crown gear has already been determined. If we let E represent the amount of the offset of the line of action 13 from the axis 10 of the crown gear, X, the distance of any point 19 on the pitch of the hob thread from the pitch line 16, and $y$, the ordinate of said point, indicating its distance from the line 13, and if we let $s$ represent the lead angle of the hob thread at the point 19, which angle is the angle included between the perpendicular 21 passing through said point and the line 13, it follows that:

$$\tan s = \frac{E}{X}$$

and that $$\frac{dy}{dx} = \cot s = \frac{1}{\tan s} = \frac{x}{E}$$

or $E dy = x dx$. This relationship will be true of all points of the hob thread, as for instance point 20. By integration: $2Ey = x^2$, which is the equation of a parabola.

The developed pitch lines of the hob thread are therefore part of parabolas and the thread of the hob in development will extend therefore, along a parabola, whose axis 16 extends in a peripheral direction relative to the hob. The parameter of the parabola equals the amount E by which the hob axis 13 is offset from the axis 10 of the basic crown gear. The parabolas 22 and 23 of the opposite sides of the hob thread will be identical. The pitch lines 24 and 25 of the crown gear will, therefore, also be identical. This relationship permits the production of accurate mating gears with hobs of opposite hand. The normals 21, 21' and 21'' to the pitch lines of the hob thread moreover, at the intersection of said pitch lines with generatrix 13 will all intersect in the point 17.

As is well known the pitch lines of crown gear teeth and the developed pitch lines of bevel gear teeth are identical. A hob constructed according to this invention therefore, may be used to produce correct bevel gears.

In development the hob thread extending along the pitch line 23 overlaps the tooth side 25 of the crown gear. This apparent interference occurs in development only and may be eliminated in actuality by using a hob of suitable dimensions.

Preferably the hob employed to produce bevel gears will be provided with a multiple thread. This and the structure of the hob permit the production of teeth of moderate longitudinal curvature and spiral angle.

Figure 2:
Figs. 2 and 3 are diagrammatic plan and side elevations, respectively, showing the method by which the new hob may be used to produce bevel gears.
Figure 3:
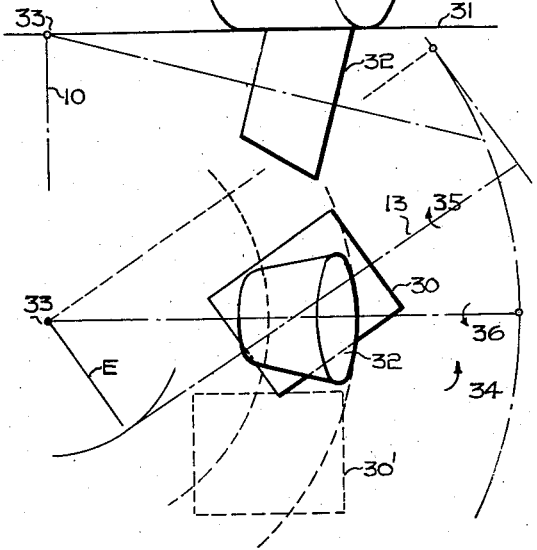

Figs. 2 and 3 show diagrammatically the method employed in producing bevel gears with a hob constructed according to this invention. The hob 30 is set in tangential relation to the pitch plane 31 of the basic crown gear so that the cylindrical pitch surface of the hob will contact with said plane along the line 13. The hob will be positioned so that the axis of the parabola of its thread is at the distance A from the axis of the crown gear and will be offset from the axis 10 by the distance E equal to the parameter of the parabolas of the hob thread. The blank 32 is so positioned that its pitch cone contacts with the pitch plane 31 of the crown gear and its apex 33 coincides with the center of the crown gear. The hob and blank are rotated in engagement about their respective axes in timed relation in correspondence to their respective numbers of threads or teeth. In addition a relative movement is simultaneously imparted between the hob and blank about the axis 10 of the crown gear, so that the relative movement between the hob and blank is of a gear rolling on the basic crown gear. In the figures the hob is represented as being translated about the axis of the crown gear. An initial position of the hob is shown in Fig. 3 in dotted lines at 30'. The hob is translated in the direction indicated by the arrow 34, while the arrows 35 and 36 indicate the directions of rotation of hob and blank respectively.

Figure 4:
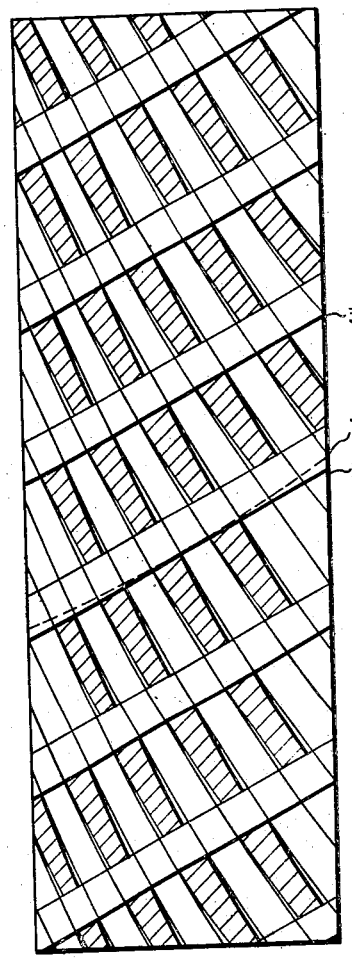
Fig. 4 is a view showing the hob in development, showing the proposed type of flutes.

For reasons of simplicity in making the hob and in resharpening it, I usually prefer to provide the hob with helical flutes, rather than with flutes which might be perpendicular to the hob thread along its entire length. The preferred type of flute is indicated in full lines at 37 in Fig. 4, while a perpendicular flute is indicated in dotted lines at 38 in the same figure. Preferably the number of flutes or gashes will have no factor in common with the number of threads. Thus the hob indicated in Fig. 4 has seven threads and six flutes. This arrangement has been found to produce a smoother finish on the gear teeth.

Figure 5:
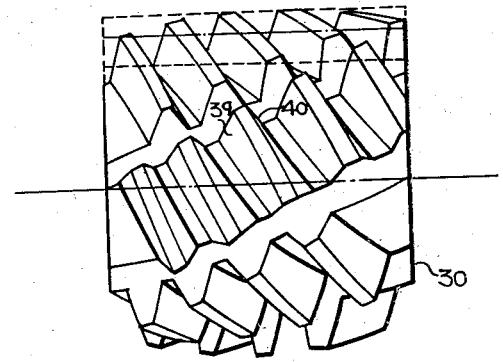
Fig. 5 is a side elevation of a hob constructed according to this invention.
Figure 7:
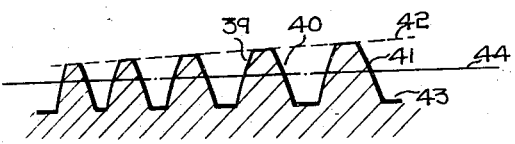
Fig. 7 is a detail sectional view showing the tooth profiles of a modified form of my hob.
Figure 6:
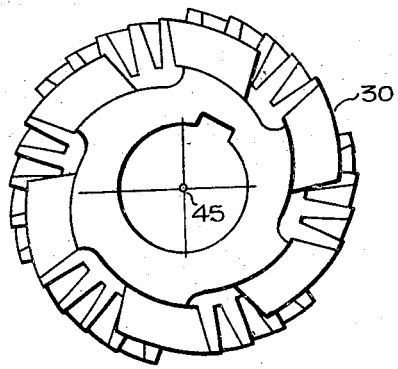
Fig. 6 is an end elevation of the same.

When the hob is multiple threaded it is preferably provided with convexly curved cutting edges 39 and 40, shown in Figs. 5 and 7. The curvature of a transverse section of a hob thread should be about such that two hobs of opposite hand adapted to produce conjugate gears should mesh with one another like two gears on parallel axes, the cylindrical pitch surfaces of the two hobs rolling together without sliding.

The parabolic nature of the hob thread provides a hob of changing lead and changing lead angle and the pitch of the thread will change accordingly. It is generally preferable therefore, to diminish the height of the teeth 41 of the hob with the diminishing pitch. The outside of the hob thread is then made slightly tapered as indicated by the dotted lines 42 in Fig. 7. This change does not affect the essential cylindrical nature of the hob, however, the bottom of the hob thread remaining parallel, as indicated at 43, to the pitch line 44 of the hob and to the axis 45. In certain cases it may be desirable also to slightly taper the bottom of the hob thread, but in this case also the pitch surface of the hob will remain cylindrical.

While I have described my invention in connection with the production of bevel gears specifically, it will be understood that with modifications it may be applied also to the production of other gears, particularly to the production of gears from conical blanks. In general, while I have illustrated and described a preferred embodiment of the invention, it will be understood that the invention is capable of further modification within the limits of the disclosure and the scope of the appended claims. This application is intended to cover any variations, uses, or adaptations of my invention, following, in general, the principles of the invention and including such departures from the present disclosure as come within known or customary practice in gear cutting and may be applied to the essential features hereinbefore set forth and as fall within the limits of the appended claims.

Having thus described my invention, what I claim is:

1. A hob having its cutting portions arranged in a thread which, in development, extends along a parabola.

2. A hob having its cutting portions arranged in a thread which, in development, extends along a parabola, the axis of which extends in a peripheral direction relative to the hob.

3. A hob having its cutting portions arranged on a cylindrical body and in a continuous thread, the normals to which along a straight line generatrix of the pitch surface of the hob intersect in a point.

4. The method of producing gears which consists in selecting a hob having its cutting portions arranged in a continuous thread, the normals to which, in development, along a straight line generatrix of the pitch surface of the hob, intersect in a point, positioning said hob and a conical gear blank so that the axis of the hob is offset from the apex of the blank by an amount equal to the distance of said intersection point of the normals from the hob axis, and rotating the hob and blank in timed relation.

5. The method of producing gears which consists in selecting a hob having its cutting portions arranged in a continuous thread, the normals to which, in development, along a straight line generatrix of the pitch surface of the hob, intersect in a point, positioning said hob and a conical gear blank so that the axis of the hob is offset from the apex of the blank by an amount equal to the distance of the intersection point of said normals from the hob axis, rotating the hob and blank in timed relation and simultaneously imparting an additional relative movement between hob and blank about the apex of the blank.

6. The method of producing gears which consists in rotating in timed relation a gear blank and a hob having its cutting portions arranged in a thread extending along a parabola in development.

7. The method of producing gears which consists in rotating in timed relation a conical gear blank and a hob having its cutting portions arranged in a thread extending along a parabola in development and simultaneously imparting an additional relative movement between the hob and blank about the apex of the blank.

8. The method of producing gears which consists in selecting a hob having its cutting portions arranged in a thread extending along a parabola in development, positioning said hob and a conical gear blank so that the axis of the hob is offset from the apex of the blank by an amount equal to the parameter of said parabola and rotating the hob and blank in timed relation.

9. The method of producing gears which consists in selecting a hob having its cutting portions arranged in a thread extending along a parabola in development, positioning said hob and a conical gear blank so that the axis of the hob is offset from the apex of the blank by an amount equal to the parameter of said parabola and rotating the hob and blank in timed relation, while simultaneously imparting an additional relative movement between the hob and blank about the apex of the blank.

10. The method of producing gears which consists in positioning a cylindrical hob and a gear blank so that normals to the hob threads and the teeth to be produced on the blank, drawn from the intersection points of said thread and teeth, in development, with a generatrix of the pitch surface of the hob, intersect in a single point and rotating the hob and blank in timed relation.

11. The method of producing gears which consists in positioning a cylindrical hob and a gear blank so that normals to the hob threads and the teeth to be produced on the blank, drawn from the intersection points of said thread and teeth, in development, with a generatrix of the pitch surface of the hob, intersect in a single point and rotating the hob and blank in timed relation, while simultaneously imparting an additional relative movement between the hob and blank about the apex of the blank.

12. The method of producing gears which consists in employing a hob having its cutting portions arranged in a thread extending along a parabola in development, positioning the hob and a conical gear blank so that the hob is offset laterally from the apex of the blank by an amount equal to the parameter of said parabola and axially by an amount such that the axis of said parabola is tangent to the pitch circle of the blank, in development, rotating the hob and blank in timed relation and simultaneously imparting an additional relative movement between the hob and blank about the apex of the blank.

ERNEST WILDHABER.